United States Patent [19]
Orshansky, Jr., deceased et al.

[11] 4,168,637
[45] Sep. 25, 1979

[54] TRANSMISSION WITH A FIRST-STAGE HYDROSTATIC MODE AND TWO HYDROMECHANICAL STAGES

[75] Inventors: Elias Orshansky, Jr., deceased, late of San Francisco, Calif., by Betty B. Orshansky, executrix; William E. Weseloh, San Diego, Calif.

[73] Assignee: Orshansky Transmission Corporation, New York, N.Y.

[21] Appl. No.: 787,767

[22] Filed: Apr. 15, 1977

[51] Int. Cl.$^2$ ............................ F16H 47/04; F16H 57/10
[52] U.S. Cl. ................................................. 74/687; 74/764
[58] Field of Search ............................ 74/687, 689, 764

[56] References Cited
U.S. PATENT DOCUMENTS

| | | | |
|---|---|---|---|
| 3,100,405 | 8/1963 | Brass | 74/764 |
| 3,667,321 | 6/1972 | Maurice | 74/687 X |
| 3,777,593 | 12/1973 | Mooney, Jr. et al. | 74/687 |
| 3,861,240 | 1/1975 | Nolan et al. | 74/687 |
| 3,866,490 | 2/1975 | Orshansky, Jr. | 74/687 |
| 3,946,623 | 3/1976 | Murakami et al. | 74/764 X |
| 3,988,949 | 11/1976 | Weseloh et al. | 74/687 |

FOREIGN PATENT DOCUMENTS 1185883  1/1965  Fed. Rep. of Germany ............ 74/689

Primary Examiner—Lance W. Chandler
Attorney, Agent, or Firm—Owen, Wickersham & Erickson

[57] ABSTRACT

A power transmission having two planetary assemblies, each having at least one carrier with planet gears, at least one sun gear, and at least one ring gear. A speed-varying module is connected in driving relation to the input shaft and in driving relationship to the sun gear or gears of the first planetary assembly. The speed-varying means may comprise a pair of hydraulic units hydraulically interconnected so that one serves as a pump while the other serves as a motor and vice versa, one of the units having a variable stroke and being connected in driving relation to the input shaft, the other unit, which may have a fixed stroke, being connected in driving relation to the sun gear. The input shaft is also connectable by a first clutch to a carrier of the first planetary assembly and by a second clutch to a sun gear of the second planetary assembly. A brake grounds the first carrier in the first range and in reverse and causes drive to be delivered to the output through a ring gear of the first planetary assembly in a hydrostatic mode. The carrier of the second planetary assembly being connected in driving relationship to that ring gear, and in all ranges these two elements transmit the drive to the output shaft.

31 Claims, 15 Drawing Figures

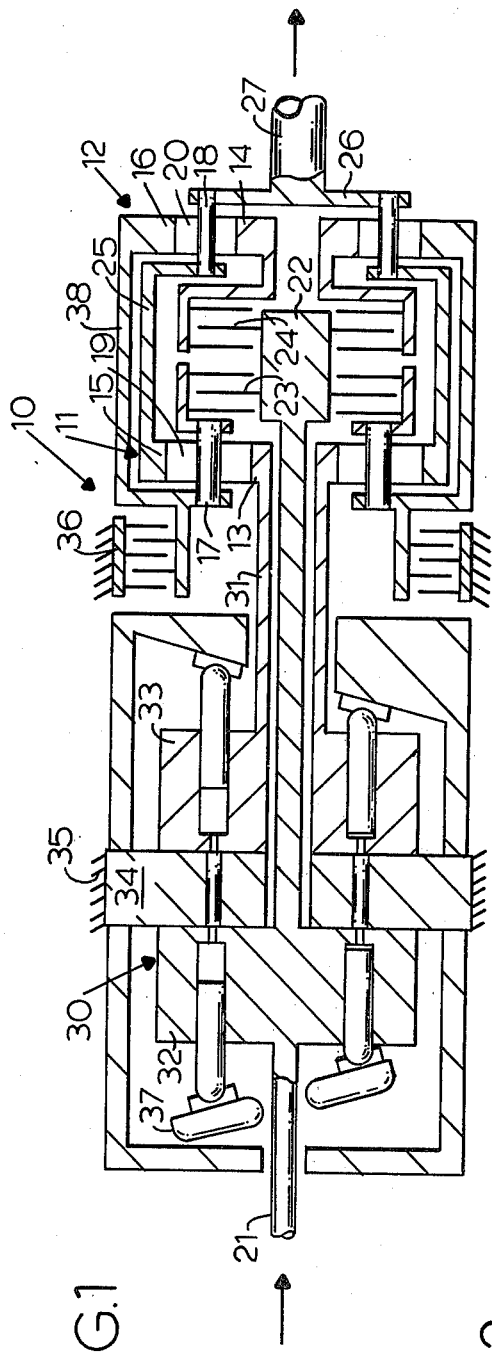
FIG.1
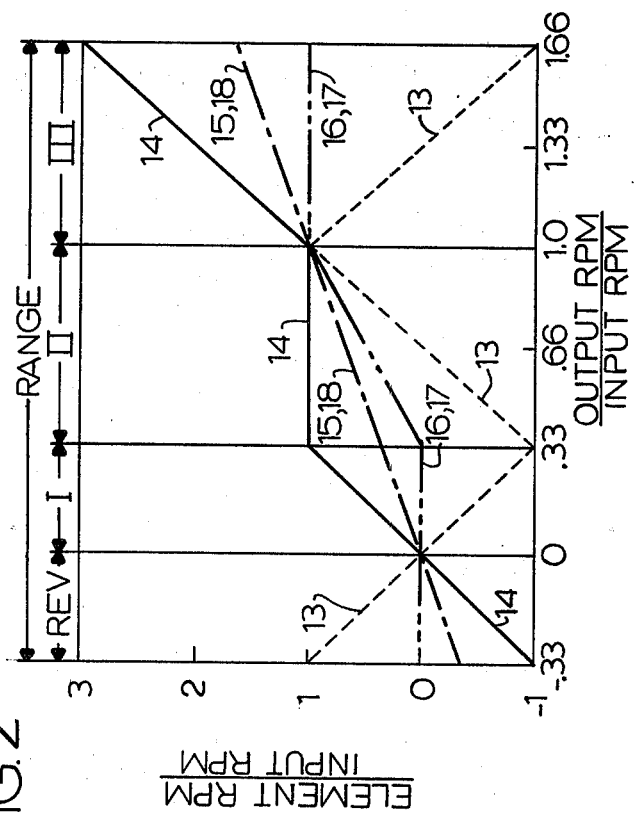
FIG.2
FIG.1A

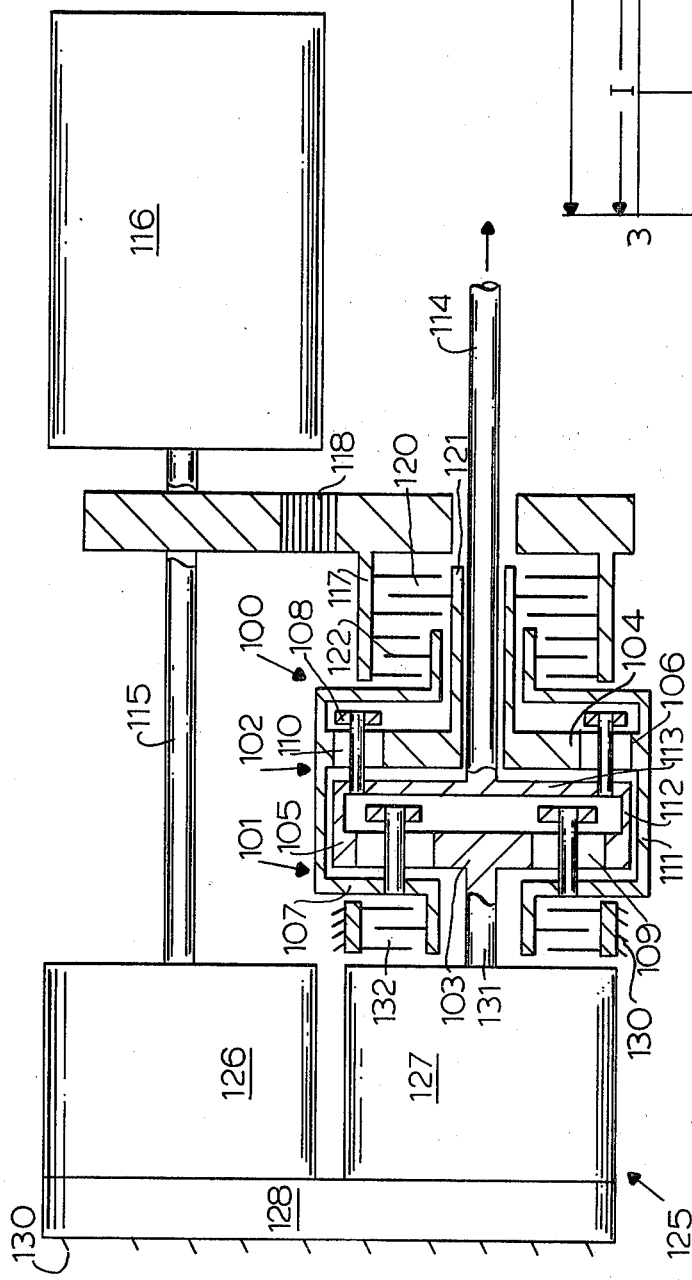
FIG.5
FIG.5A
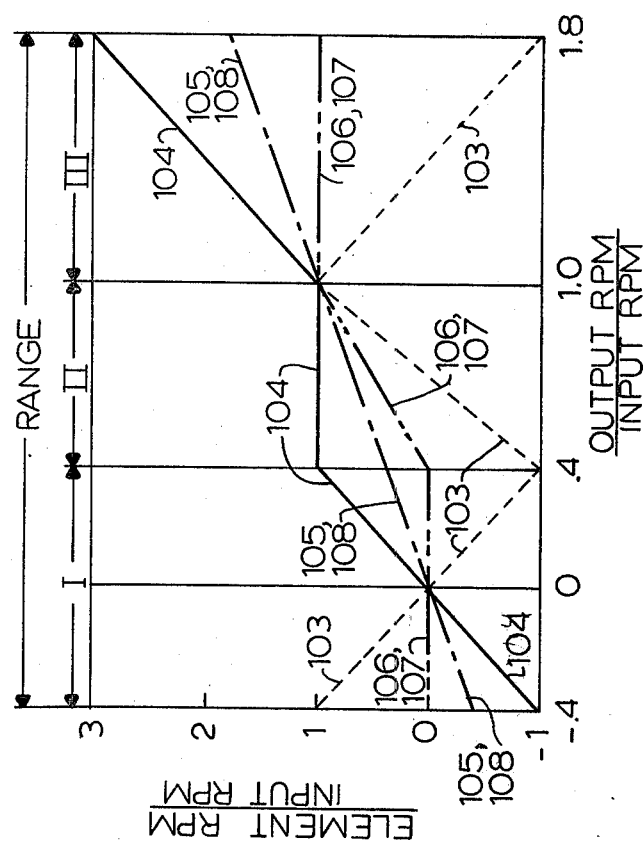
FIG.6

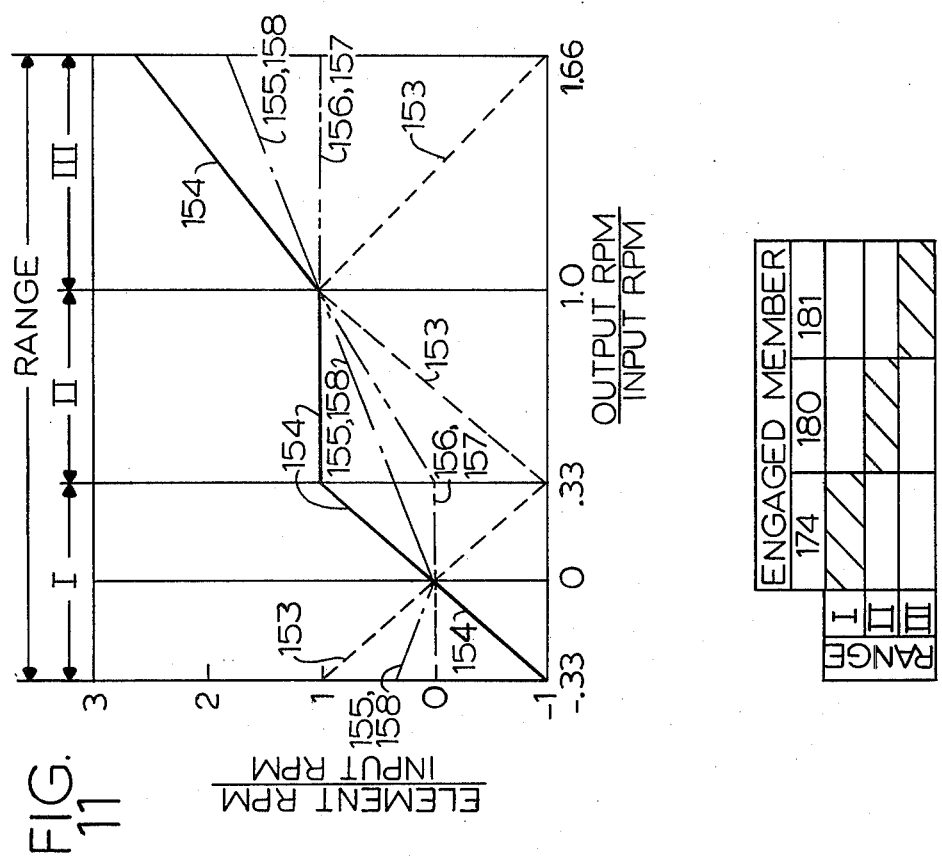
FIG. 11
FIG. 10A
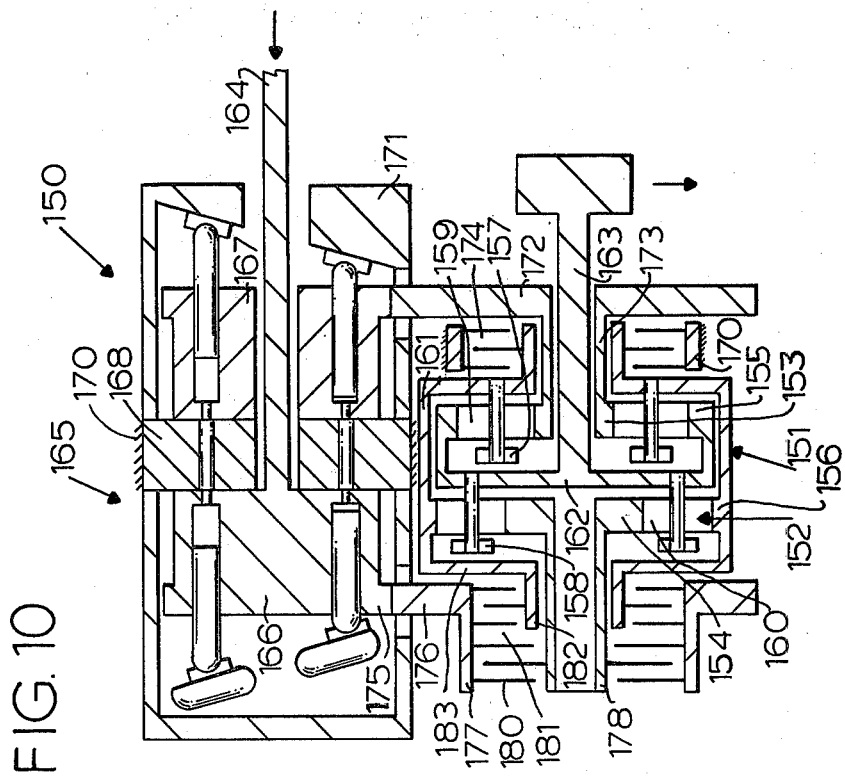
FIG. 10

TRANSMISSION WITH A FIRST-STAGE HYDROSTATIC MODE AND TWO HYDROMECHANICAL STAGES

The Government has rights in this invention pursuant to Contract No. EY-76-C-03-1165 awarded by the U.S. Energy Research and Development Administration.

BACKGROUND OF THE INVENTION

This invention relates to an improved transmission. It may be considered an improvement on the hydromechanical transmission described in U.S. Pat. No. 3,888,139 which issued June 10, 1975, to Elias Orshansky, Jr.

The transmission of U.S. Pat. No. 3,888,139, and the transmission of the present invention each provide a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions.

In U.S. Pat. No. 3,888,139 the hydraulic units used as a speed-varying means were driven by gears from either the input or the reaction or both. The present invention eliminates those gears, four gears altogether, and their bearings, thereby reducing the size and weight of the transmission and reducing the cost of the transmission.

It is also an object to provide a transmission which can weigh less than conventional transmissions.

The transmission of this invention may have a concentric or coaxial construction or may have a transverse construction. It has an entirely different hydrostatic start from the transmission of U.S. Pat. No. 3,888,139, in order to provide reduction in the number of parts, the size, the weight, and also the cost of the transmission.

In order to avoid having to use the extra gears which connected the planetary assemblies to the hydraulic units in U.S. Pat. No. 3,888,139, the hydraulic units in one form of the present invention are especially designed to be installed in line with the planetary assemblies without a separate gear drive. This considerably reduces power losses, size, weight, and cost. However, there are sometimes advantages in transverse construction, and in another form of the invention using such transverse construction cost savings in the hydraulic units become feasible.

The invention may also be considered an improvement over our co-pending application Ser. No. 787,851, filed Apr. 15, 1977, which requires three planetary assemblies; all of which have the sun gears on a common shaft.

A conventional torque converter or manual transmission requires the imposition of many compromises upon the engine, because it must provide adequate performance over a wide range of torque and speed. The practice of most vehicle manufacturers of providing a selection of optional axle ratios for the vehicle is only one of the many attempts which have been made to reduce the compromise for any given application.

The infinitely variable transmission of this invention enables the engine to be operated at all times in a speed range in which it is capable of producing rated power. Therefore, vehicle performance in any given application can be maintained or even improved while utilizing a smaller engine. In contrast, infinitely variable transmissions of the pure hydrostatic type are limited to applications where significant power losses can be tolerated in return for the benefits of improved transmission ratio control.

Hydromechanical transmissions offer the control benefits of hydrostatic transmission, and, since only a portion of the engine power is transmitted by the hydraulic units, they provide a means for removing the performance barrier of excessive power losses. The extent to which any hydromechanical transmission can accomplish this is a function of the percentage of power which must be transmitted hydraulically.

The new transmission hereof can transmit high horsepower over a wide range of output speed variation at a constant input speed and horsepower. It differs from the previous transmissions in its ability to transmit power over a wide range with a minimum of transmitted hydraulic horsepower, and a minimum of installed hydraulic horsepower. It also provides full engine braking over its entire range of operation.

The invention avoids the pitfalls of excessive complexity, speeds, or loads in the gear train. Simplicity of construction and conventional gear ratios and proportions help to hold cost down. Maximum reliability and minimum cost have been obtained by utilizing standard commercial hydraulic unit design practice which enables operation totally within long-life rated conditions of speed and power. In addition, the clutches can utilize the same low-cost paper elements presently employed in high production automobile torque converter transmissions. For a comparable power rating, a smaller number of elements than in a torque converter power shift transmission can be utilized, because at all shift points the clutch elements are virtually synchronous. The number of elements is, therefore, a function not of their thermal capacity, but of their steady-state torque capacity.

This new transmission is valuable for use in passenger and competition cars, highway and off-highway trucks, buses, agricultural and construction equipment, military vehicles, and industrial drives and machine tools.

The use of this transmission in a piston-engine vehicle enables reduction of exhaust emissions and improvement in the specific fuel consumption by programming the engine to operate within its optimum range under all road conditions without regard to transmission torque output requirements. Both hydrocarbon and nitrogen oxide emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

Rotary combustion engines can use this new transmission with the same advantages as for piston engines. The benefit in reduction of hydrocarbon emissions is there of a much greater magnitude, however, due to the high rate of change in emission characteristics for rotary combustion engines with respect to engine speed.

Gas turbines would also be benefited significantly by this invention. Manufacturing cost is a major drawback in producing a turbine today. This, to a large degree, is a function of the complexity required in the design of a turbine for use under the varying torque and speed conditions of a road vehicle. With the hydromechanical transmission of this invention, the transmission can be programmed to operate the turbine only under these conditions during which it is most efficient. Therefore, a single-shaft turbine becomes feasible, as it is more economical to manufacture than the two-shaft design normally proposed for vehicle application. Since constant-speed operation is feasible, the problems in connection with the throttle response time of a turbine do not arise. Because there is an infinite variation in speed and torque in the transmission, and no interruption of power flow occurs at any time, the turbine design speeds can be maintained.

Another important feature of the invention is the provision of gear proportioning so that the hydraulic horsepower on both sides of the shift is the same. This means that the efficiency of the transmission is nearly the same on each side of the shaft points, and, therefore, the control system can be greatly simplified.

SUMMARY OF THE INVENTION

The power transmission of the invention includes, in combination with input means and output means, two planetary assemblies, each having its own carrier and its own planet, sun, and ring gears, at least one of each, and in some forms of the invention more than one in one assembly. A speed-varying module connected to the input drives the sun gear or gears of the first planetary set. The speed-varying module may comprise a pair of hydraulic units hydraulically interconnected, so that one serves as a pump while the other serves as a motor and vice versa, one of the hydraulic units being connected in driving relation to the input, and the other being connected in driving relation to the sun gear or gears of the first planetary assembly.

The input means may be clutched by a first clutch to drive a carrier for the first planetary assembly or may be clutched by a second clutch to a sun gear of the second planetary assembly. The output is connected to a carrier of the second planetary assembly, which is connected to a ring gear of the first planetary assembly, and so that this second carrier and the first ring gear are always in driving relation with each other and with the output shaft. A brake may be used for grounding a carrier of the first planetary assembly and causing the drive from the speed-varying module through a first set of planetary gears to be delivered to the output means through its ring gear and the carrier of the second set.

The brake is a low-range clutching means used for both reverse and for starting in a Range I; the speed-varying module can be run in reverse, forward, or zero drive, and at varying speeds in forward or reverse, such as by respective strokings of a controlling wobble-plate.

The speed of the sun gear of the second planetary assembly increases rapidly during forward transmission drive in Range I and at the end of that range becomes equal to the speed of the input shaft. When the speed of the sun gear of the second planetary assembly becomes equal to the speed of the inut shaft, then it is clutched to the input shaft to begin Range II, the brake being released immediately thereafter. During Range II the brake may be disengaged and simply allowed to slip, producing very low loss, while the speed-varying unit provides for speed increase in Range II.

During Range II, the speeds of all the other planetary assembly elements (sun gears, ring gears, and carriers) approach the speed of the second sun gear and of the input shaft. When all these elements reach the speed of the input shaft, the high range clutch is engaged, putting the transmission synchronously into high range, Range III, and the Range II clutch is released immediately thereafter.

The shifts between ranges in this new transmission occur at synchronized speeds, without interruption of power flow on either the upshift or the downshift. For this purpose a desired gear ratio is provided.

The starting and reverse ranges are hydrostatic and, in most cases, operate at less than maximum power; they may approach a maximum constant torque, since maximum output torque may be limited by either maximum pressure or traction. The hydromechanical or working ranges, Ranges II and III, may operate at full and constant horsepower.

BRIEF DESCRIPTION OF THE DRAWINGS

In the drawings:

FIG. 1 is a diagrammatic view in elevation and in section of a transmission illustrating the principles of this invention.

FIG. 1A is a brake and clutch engagement and range diagram for the transmission of FIG. 1.

FIG. 2 is a speed lines diagram for the transmission of FIG. 1 with the ratio of output speeds to input speeds, in r.p.m., being plotted against the ratio of the speeds of the planetary members to the input speeds in r.p.m. The three forward ranges and the reverse range are identified.

FIG. 5 is a view similar to FIG. 1 of a modified form of the invention wherein the transmission is transverse to the vehicle.

FIG. 5A is a brake and clutch engagement and range diagram for the transmission of FIG. 5.

FIG. 6 is a speed lines diagram of the same type as FIGS. 2 and 4 for the transmission of FIG. 5.

FIG. 10 is a view similar to FIG. 1 of another modified form of the invention wherein the transmission is transverse to the vehicle.

FIG. 10A is a brake and clutch engagement and range diagram for the transmission of FIG. 10.

FIG. 11 is a speed lines diagram of the same type as FIGS. 2, 4, and 6 for the transmission of FIG. 10.

DESCRIPTION OF PREFERRED EMBODIMENTS

Figure 4:
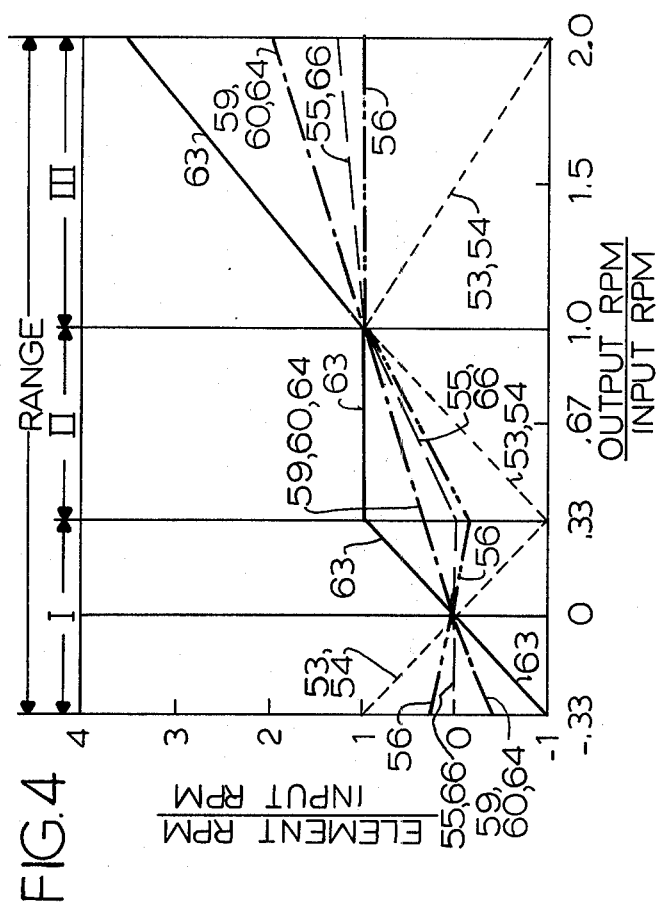
FIG. 4 is a speed lines diagram of the same type as that of FIG. 2 for the transmission of FIG. 3.

The transmission 10 of FIGS. 1, 1A and 2:

One transmission 10 of this invention has two planetary assemblies 11 and 12 having respective sun gears 13 and 14; respective ring gears 15 and 16; and respective carriers 17 and 18 with respective planet sets 19 and 20.

An input shaft 21, concentric with the planetary assemblies 11 and 12, has a portion 22 which may be connected by a first clutch 23 to the carrier 17 of the first planetary assembly 11 or may be connected by a second clutch 24 to the sun gear 14 of the second planetary assembly 12. The ring gear 15 of the first planetary assembly 11 is connected rigidly to the carrier 18 of the second planetary assembly 12, as by a member 25, and the carrier 18 is connected directly to a flange 26 on an output shaft 27.

The input shaft 21 is also drivably connected to a speed-varying hydraulic module 30, the other end of which is connected to a hollow shaft 31 that carries the sun gear 13 of the first planetary assembly 11. The module 30 preferably comprises a variable-displacement hydraulic unit 32 in driving relationship with a fixed-displacement hydraulic unit 33, with hydraulic fluid transmitted between them through a stationary port plate block 34, attached to a frame 35. The variable-displacement unit 32 has a wobble plate 37.

A brake 36, when engaged, holds the first carrier 17 stationary in the hydrostatic ranges of both forward Range I and reverse, while the clutch 24 is used in hydromechanical Range II, and the clutch 23 is used in hydromechanical Range III.

In this embodiment, the input shaft 21, output shaft 27, the hydraulic units 32 and 33, and the planetary assemblies 11 and 12, are all co-axial.

When the brake 36 is engaged, the first planetary gears 19 rotate but are arrested in their planetary motion. This makes a reversing drive between the first sun gear 13 and the first ring gear 15, causing a rotation of the first ring gear 15 which is reversed in rotation to that of the first sun gear 13. The low-range brake 36 is engaged for starting (and also for reverse), while the clutches 23 and 24 are at that time disengaged, so that the driving connection between the hydraulic module 30 and sun gear 13 causes the first ring gear 15 to run in a reverse direction and at a reduced speed with respect to the sun gear 13.

In this region the drive is purely hydrostatic, and when the variable-displacement hydraulic unit 32 is on zero stroke, the vehicle is at a standstill, since no drive is then coming through the speed-varying module 30 and since the brake 36 is engaged.

If a wobble plate 37 of the variable-displacement unit 32 is stroked in one direction, the transmission 10 is in "reverse," and if the wobble plate 37 is stroked in the opposite direction, the transmission 10 is in "forward." When the wobble plate 37 is stroked in "forward," the sun gear 13 traverses in speed from zero to the negative speed, as shown in Range I in FIG. 2, and with the carrier 17 of the first planetary assembly 11 grounded by the brake 36, the speed of the first ring gear 15 increases upwardly from zero, as shown in Range I in FIG. 2.

During Range I, the output shaft 27 is being driven by the connection 25 from the first ring gear 15 through the second carrier 18, so that the output shaft 27 begins to turn and gradually increases in speed. Also, the carrier 18 of the second planetary assembly 12, driven by the first ring gear 15, acts through the planetary gears 20 to drive the sun gear 14. Furthermore, the second ring gear 16, which is connected to the first carrier 17 by a member 38 is held stationary by the brake 36; hence, the speed of the second sun gear 14 increases more rapidly than does the speeds of the output shaft 27 and the carrier 18. When the forward speed of the second sun gear 14 becomes equal to the forward speed of the input shaft, the clutch 24 is engaged, and the transmission goes into Range II, the brake 36 being released or disengaged immediately thereafter. This is the first hydromechanical range.

The drive continues from the second carrier 18 to the output shaft 27. The low-range brake 36 simply slips, producing some loss, but such losses are usually very low. The second ring gear 16, being released, is varied in speed by the action of the hydraulic units 32 and 33 on the first sun gear 13 and the first carrier 17, to which the second ring gear 16 is attached.

When the end of Range II is reached, the speed of the second ring gear 16, as well as the speed of every planetary element—the first sun gear 13, the two carriers 17 and 18, and the first ring gear 15—has reached a speed to equal the speed of the input shaft 21 and therefore the speed of the second sun gear 14; it is therefore possible to engage the high-range clutch 23, which puts the transmission into the high Range III, immediately thereafter releasing the clutch 24.

The first planetary assembly 11 of FIG. 1 serves a multiplicity of functions. It carries load in all three ranges. In the hydrostatic Range I, the planetary assembly 11 is a simple power-transmitting gear train. In Range II, the planetary assembly 11 forms a portion of a power-splitting planetary assembly in combination with the second planetary assembly 12. In Range III the first planetary assembly 11 splits the power between input, output, and reaction. In Ranges II and III its sun gear 13 is the reaction gear.

Figure 9:
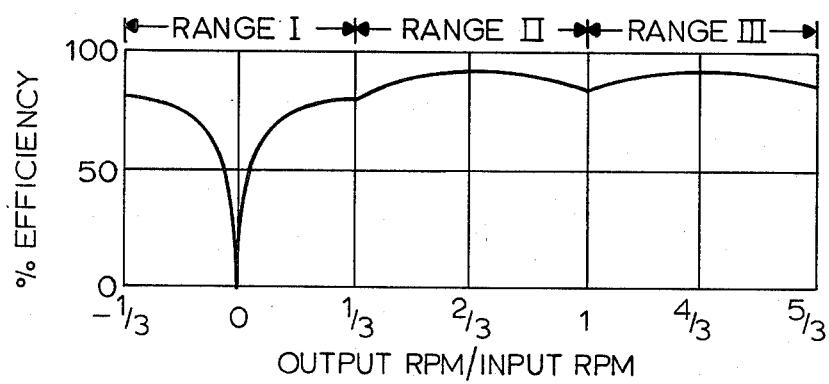
FIG. 9 is a graph plotting the percent efficiency against the ratio of output r.p.m. to input r.p.m. for the transmission of FIG. 1.

A characteristic efficiency curve for the transmission of FIG. 1 is shown in FIG. 9. It will be seen that except at starting (in either direction) and therefore in the earliest portions of the hydrostatic mode, the transmission is unusually efficient. Note that efficiencies are greatest in the middle portions of Ranges II and III.

Figure 3:
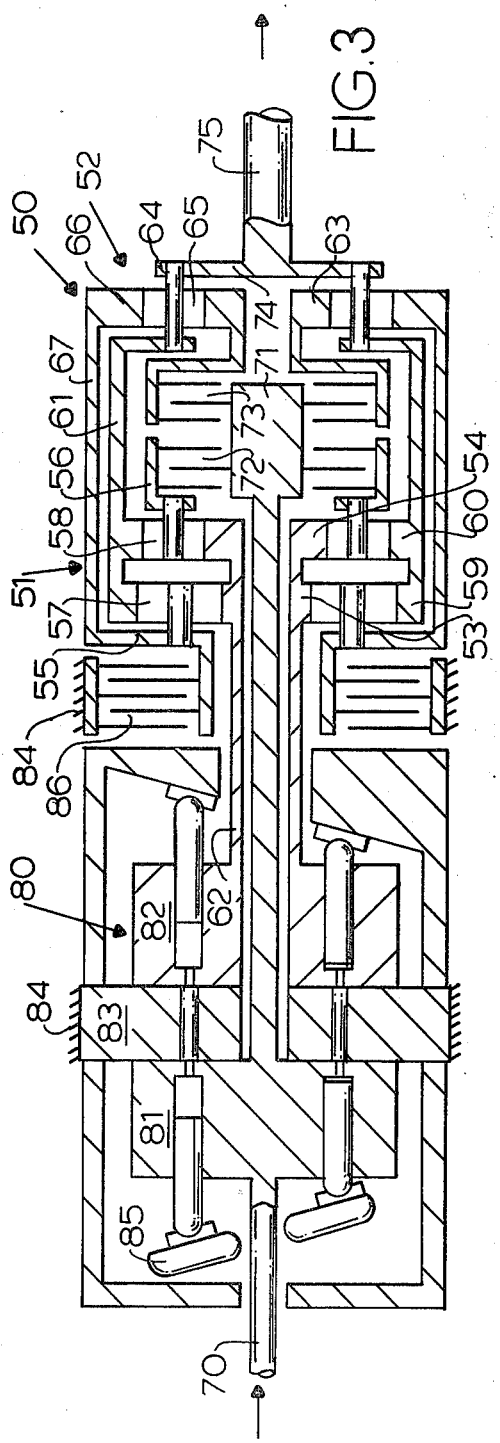
FIG. 3 is a view similar to FIG. 1 of a modified form of the invention, wherein the first planetary assembly has two sun gears, two ring gears, and two carriers, with the ring gears being connected together and the sun gears being connected together, but the carriers and their planets are not directly interconnected.
Figure 3A:
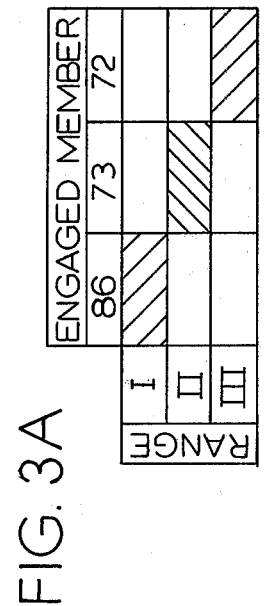
FIG. 3A is a brake and clutch engagement and range diagram for the transmission of FIG. 3.

The transmission 50 of FIGS. 3, 3A, and 4:

Another transmission 50 of this invention has two planetary assemblies 51 and 52. The first planetary assembly 51 has two sun gears 53 and 54, two carriers 55 and 56 with respective planets 57 and 58, and has two ring gears 59 and 60. The ring gears 59 and 60 are rigidly connected to each other and to a drum 61. The two sun gears 53 and 54 are rigidly mounted on a common shaft 62. Moreover, the ratio of the second ring gear 60 to the second sun gear 54 is less than the ratio of the first ring gear 59 to the first sun gear 53. The second planetary assembly 52 has one sun gear 63, one carrier 64 with planets 65, and one ring gear 66. The ring gear 66 is connected to the carrier 55 by a drum 67, and the carrier 64 is connected to the drum 61 carrying the two ring gears 59 and 60.

An input shaft 70, concentric with the planetary assemblies 51 and 52, has a portion 71 which may be connected by a first clutch 72 to the carrier 56 of the first planetary assembly 51 or may be connected by a second clutch 73 to the sun gear 63 of the second planetary assembly 52. The ring gears 59 and 60 of the first planetary assembly 51 and the carrier 64 of the second planetary assembly 52 are connected rigidly as by a flange 74 on an output shaft 75.

The input shaft 70 is also drivably connected to a speed-varying hydraulic module 80, the other end of which is connected to the hollow shaft 62 that carries the sun gears 53 and 54 of the first planetary assembly 51. The module 80 preferably comprises a variable-displacement hydraulic unit 81 in driving relationship with a fixed-displacement hydraulic unit 82, with hydraulic fluid transmitted between them through a stationary port plate block 83, attached to a frame 84. A wobble plate 85 on the unit 81 enables variation of its stroke.

A brake 86, when engaged, holds the carrier 55 stationary in the hydrostatic ranges of both forward Range I and reverse, while the clutch 73 is used in hydromechanical Range II, and the clutch 72 is used in hydromechanical Range III.

In this embodiment, the input shaft 70, output shaft 75, the hydraulic units 81 and 82, and the planetary assemblies 51 and 52 are all coaxial.

When the brake 86 is engaged, the planetary gears 57 rotate but are arrested in their planetary motion. This makes a reversing drive between the sun gear 53 and the ring gear 59, causing a rotation of the first ring gear 59 which is reversed in the direction of rotation from that of the first sun gear 53. The sun gear 54 necessarily rotates at all times at the same speed as the sun gear 53, while the ring gear 60 necessarily rotates at all times at the same speed as the ring gear 59; therefore, the gears 54 and 60 do not affect operation in the low range. The low-range brake 86 is engaged for starting (and also for reverse), the clutches 72 and 73 at that time being disengaged, the driving connection between the sun gear 53 and the ring gear 59 causing the ring gear 59 to run in a reverse direction and at a reduced speed with respect to the sun gear 53. The sun gear 53 itself is driven by the speed-varying module 80 during starting and reverse. In this region the drive is purely hydrostatic, and when the variable-displacement hydraulic unit 81 is on zero stroke, the vehicle is at a standstill, since no drive is then coming through the speed-varying module 80 and since the brake 86 is engaged.

If the wobble plate 85 of the variable-displacement unit 81 is stroked in one direction, the transmission 50 is in reverse, and if the wobble plate 85 is stroked in the opposite direction, the transmission 50 is in forward. When the wobble plate 85 is stroked in forward, the sun gear 53 traverses in speed from zero to a negative speed, as shown in Range I in FIG. 4, and with the carrier 55 of the first planetary assembly 51 grounded by the brake 86, the speed of the first ring gear 59 increases, as shown in Range I in FIG. 4. Operation in Range I and in reverse is, therefore, substantially like that of the transmission 10 of FIG. 1.

As in the transmission 10, the shift into Range II for the transmission 50 is made when the speed of the sun gear 63 of the second planetary assembly 52 becomes equal to the speed of the input shaft 70, and the brake 86 is then released.

During Range II, operation of the transmission 50 is substantially like that of the transmission 10, the speeds of all planetary elements either remaining at the input speed (as does the sun gear 63) or approaching and converging at the input speed, as shown in FIG. 4. The shift is made as before, by engaging the clutch 72 and disengaging the clutch 73. The transmission 50 is now in Range III.

It is in Range III that the differences between the transmissions 50 and 10 become significant. As can be seen by comparing FIG. 4 with FIG. 2, the transmission 50 goes from a ratio of 1.0 to 2.0 in Range III, whereas the transmission 10 goes from a ratio of 1.0 to 1.66, the ratios being those of output r.p.m. to input r.p.m.

This happens because in the transmission 50, the drive in Range III is from the input shaft 70 to the carrier 56, via the clutch 72, and the planets 58, the sun gear 54, and the ring gear 60 are proportionate to each other differently than are the planets 57, sun gear 53, and ring gear 59.

Thus, in Range I (and reverse) the first planetary assembly 51 is controlled by the elements 53, 55, 57, and 59; in Range II the second half of the first planetary assembly 51 (elements 54, 56, 58, and 60) rides and does not drive, and in Range III, the second half of the first assembly 51 (the elements 54, 56, 58, and 60) control the speed of the output shaft 75 relative to that of the input shaft 70, all as controlled by the hydraulic module 80.

The transmission 100 of FIGS. 5, 5A and 6:

A third transmission 100 of this invention is transverse rather than coaxial, relative to the vehicle. The transmission 100 has two planetary assemblies 101 and 102 having respective sun gears 103 and 104; respective ring gears 105 and 106; and respective carriers 107 and 108 with respective planet sets 109 and 110. As in the transmission 10 of FIG. 1, the carrier 107 of the first planetary assembly 101 is connected, as by a drum 111 to the ring gear 106 of the second planetary assembly 102. Also, the ring gear 105 of the first planetary assembly 101 is connected rigidly to the carrier 108 of the second planetary assembly 102, as by a member 112, and the carrier 108 is connected directly to a flange 113 on an ouput shaft 114.

However, in this instance, the output shaft 114 is not coaxial to its input shaft 115, but is parallel to it. This can save in length of the assembly. The input shaft 115, driven by an engine 116, may drive a drum 117, as by a chain 118. The drum 117 may be clutched by a clutch 120 to a hollow shaft 121 carrying the second sun gear 104. Alternatively, it may be clutched by a clutch 122 to the drum 111.

The input shaft 115 is also drivingly connected to a speed-varying hydraulic module 125, which preferably comprises a variable-displacement hydraulic unit 126 in driving relationship with a fixed-displacement hydraulic unit 127, with hydraulic fluid transmitted between them through suitable conduits in a port plate block 128, attached to a frame 130.

The fixed-stroke hydraulic unit 127 is mounted on a shaft 131 which also carries the first sun gear 103. A brake 132, when engaged, holds the first carrier 107 stationary in the hydrostatic ranges of both forward Range I and reverse, while the clutch 120 is used in hydromechanical Range II, and the clutch 122 is used in hydromechanical Range III.

Operation of the device is basically the same as for the transmission 10, as can be seen by comparing FIGS. 2 and 6. However, gear ratios differ somewhat. If desired, a system like that of FIG. 3 could be adapted to the transverse structure.

Gear proportioning:

For any hydromechanical transmission having a hydrostatic startup range and two simple hydromechanical ranges, we have discovered that it is possible to proportion the gears so that the hydraulic horsepower on both sides of the shift points is the same. The advantage of this feature is that efficiency of the transmission, likewise, will be nearly equal on each side of the shift points. A further advantage of this feature is that controls are greatly simplified, due to the inherent continuous efficiency profile, which lacks the discontinuities which are otherwise typical of hydromechanical transmissions.

The hydraulic power relationships in a simple hydromechanical transmission are as follows:

$R_{NR}$=output speed to input speed ratio in nonrecirculative range $R_R$=output speed to input speed ratio in recirculative range $R_O$=output speed to input speed ratio at zero reaction speed (zero hydraulic power point)

$X_{NR}$=speed ratio of $R_{NR}/R_O$ $X_R$=speed ratio of $R_O/R_R$ $P_{NR}$=percent hydraulic power at point $X_{NR}=(X_{NR}-1)/X_{NR}\times 100$ $P_R$=percent hydraulic power at point $X_R=(X_R-1)\times 100$ By definition, the hydraulic power in the hydrostatic range is 100% of input power. The beginning of the first hydromechanical or power-split range is a recirculative mode and, therefore, $P_R$ must equal $(X-1)\times 100$. $(X_R-1)\times 100$ must equal 100%, $X_R$, therefore equals 2, which is to say that if the gear proportions are such that the ratio at the zero hydraulic power point is two times the speed ratio at the beginning of the range, then the hydraulic power will be 100% of input.

At the end of the first hydromechanical range, the hydraulic power would typically be 33%. Therefore, for the second hydromechanical or power-split range, $(X_R-1)\times 100$ must equal 33 $X_R$ must equal 1.33, which is to say that if the outer speed ratio at the zero hydraulic power point is 1.33 times the output speed ratio at the beginning of the second hydromechanical range, then the hydraulic horsepower at this point will equal 33% of the input. Of course, the above relationships apply to any subsequent ranges as well. This hydraulic power matching can be accomplished between any two ranges in any simple hydromechanical transmission having any number of ranges. Also, it is possible to design a simple hydromechanical transmission having any number of ranges such that the hydraulic power on both sides of each shift is the same. This is accomplished by maintaining the speed relationships shown above. However, as a practical matter, hydraulic power matching is best suited to a three-range transmission, the first range of which is hydrostatic. Typical component speed relationships accomplishing the above-described transitions are shown in FIG. 2.

One such set of values that meets with the discussed conditions is obtained by having the ratios of the sun:planet:ring gears in the first planetary assembly be 1:1:3 and by having the ratios of the sun:planet:ring gears in the second planetary assembly be 2:1:4. The ratio of the first planetary assembly elements to those of the second planetary assembly is not critical. Thus sun:planet:ring gear ratios in the first assembly may be 3:3:9, while in that event the ratios of the sun:planet:ring gears for the second assembly could then be either 2:1:4 or 4:2:8, for example.

Typical gear tooth numbers are as follows:

| | Teeth |
|---|---|
| Sun gear 13, 53, or 103 of the first planetary assembly 11, 51, or 101 | 30 |
| Planet gears 19, 57, or 109 of the first planetary assembly 11, 51, or 101 | 30 |
| Ring gear 15, 59, or 105 of the first planetary assembly 11, 51, or 101 | 90 |
| Sun gear 14, 63, or 104 of the second planetary assembly 12, 52, or 102 | 40 |
| Planet gears 20, 65, or 110 of the second planetary assembly 12, 52, or 102 | 20 |
| Ring gear 16, 66, or 106 of the second planetary assembly 12, 52, or 102 | 80 |

Figure 7:
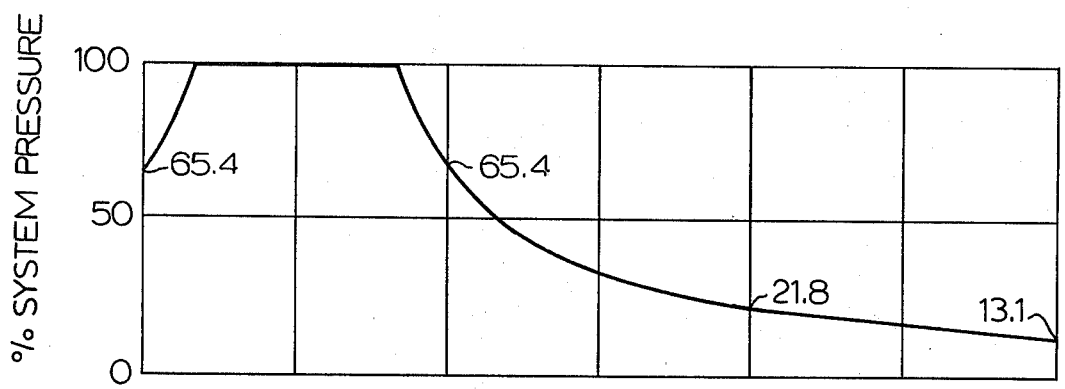
FIG. 7 is a graph relating to hydraulic pressure percentage relationship in the present invention. The percent system pressure is plotted against the ratio of output r.p.m. to input r.p.m.
Figure 8:
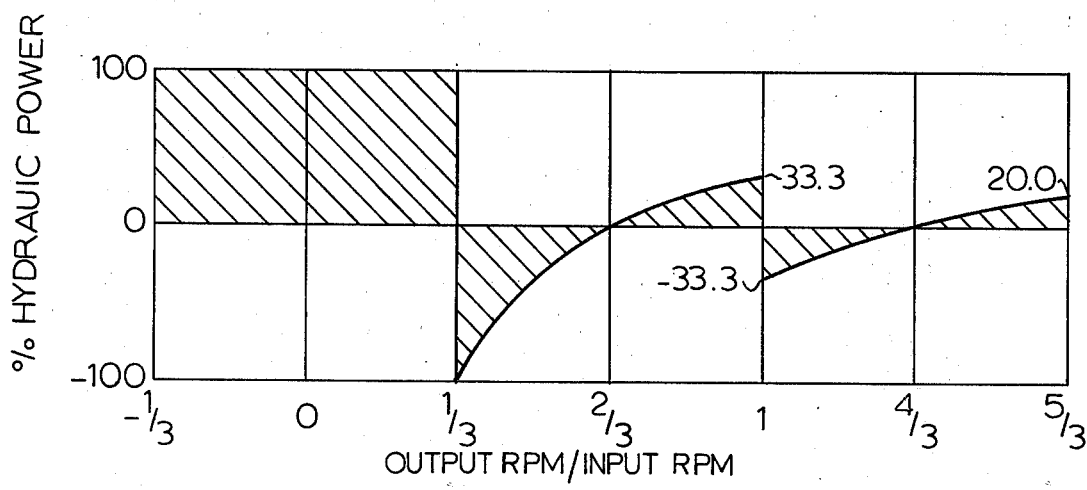
FIG. 8 is a similar graph plotting the percent hydraulic power against the ratio of output r.p.m. to input r.p.m.

The graphs FIGS. 7 and 8 show the hydraulic power and pressure relationship. Although the direction of power flow reverses as range changes are made, the magnitude is the same, and therefore, the losses are nearly the same. This characteristic simplifies controls design, as additional features would otherwise have to be added to compensate for efficiency discontinuities.

Advantages of the invention:

Some advantages of the invention have already been discussed, but there are others.

The transmission, as noted, is extremely simple in construction. In a single case it incorporates the planetary assemblies, two clutches and one brake. Moreover, the ring-to-sun ratios of the two single planetary assemblies can be of quite conventional proportions, so that sound construction can be obtained from minimum material. Simplicity of construction is also enhanced by the fact that the brake is attached to a member on the outside of the planetary assembly. Also, the oil feeds to the two clutches are simple.

The construction has the advantage of low planet gear speeds, a feature that was not possible in many hydromechanical transmission designs. The highest relative planet gear speeds occur at maximum overdrive ratio in high range, where the input speed is normally very low.

The invention also has the advantage of providing a family of transmissions, with a large portion of the parts which can remain the same from design to design. For example, the invention provides great flexibility in increasing the ratio range, as from a basic transmission like that of FIG. 1, having just two simple planetary assemblies, to a more complex transmission like that of FIG. 3 by changing only the first planetary assembly so as to add another planetary arrangment.

The transmission 150 of FIGS. 10, 10A, and 11:

A fourth transmission 150 of this invention is like the transmission 100, transverse rather than coaxial, relative to the vehicle. In other ways, it is closer to the transmissions 10 and 50. The transmission 150 has two planetary assemblies 151 and 152 having respective sun gears 153 and 154; respective ring gears 155 and 156; and respective carriers 157 and 158 with respective planet sets 159 and 160. As in the transmission 10 of FIG. 1, the carrier 157 of the first planetary assembly 151 is connected, as by a drum 161 to the ring gear 156 of the second planetary assembly 152. Also, the ring gear 155 of the first planetary assembly 151 is connected rigidly to the carrier 158 of the second planetary assembly 152, as by a flange 162, and the carrier 158 is connected directly by the flange 162 to an output shaft 163.

Once again, the output shaft 163 is not coaxial to its input shaft 164, but is parallel to it.

The input shaft 164 is drivingly connected to a speed-varying hydraulic module 165, which preferably comprises a variable-displacement hydraulic unit 166 in driving relationship with a fixed-displacement hydraulic unit 167, with hydraulic fluid transmitted between them through suitable conduits in a port plate block 168, attached to a frame 170.

The fixed-stroke hydraulic unit 167 has a gear 171 mounted thereon, which engages a gear 172 that is mounted on a hollow shaft 173, which also carries the first sun gear 153. A brake 174, when engaged, holds the first carrier 157 stationary in the hydrostatic ranges of both forward Range I and reverse.

The variable-displacement hydraulic unit 166 has a gear 175 mounted thereon which engages a gear 176 mounted on a hollow shaft 177. The second sun gear 154 is mounted on a hollow shaft 178, and a clutch 180, when engaged, locks the shaft 178 to the shaft 177. Similarly, a clutch 181, when engaged locks the shaft 177 to a shaft 182, which is connected by a flange 183 to the second ring gear 156 and, through the drum 161 to the first carrier 157. The clutch 180 is used in hydromechanical Range II, and the clutch 181 is used in hydromechanical Range III.

Operation of the device is basically the same as for the transmission 10, as can be seen by comparing FIGS. 1 and 2 with FIGS. 10 and 11.

In the transmission 150, the hydraulic module 165 is an in-line type with the variable and fixed units both being coaxial with the engine, which is not true in the transmission 100. The in-line structure makes the hydraulic module 165 easier to construct the module 125, for high structural loads due to hydraulic pressures in the module 165 may be contained in a smaller area and enable the use of a substantially minimum amount of materials. Also, the hydraulic flow path is short and straight, so that flow losses are held to a minimum.

The transmission 165 is shortened, as compared with the transmission 10 and 50 and can be packaged into the space normally available for a conventional transmission. Furthermore, since the two clutches 180 and 181 are on the end of the transmission 150 opposite to the output shaft 163 and the engine, the oil feeds to the clutch are simplified in this form of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A three-range power transmission having two shift points, comprising:
    a stationary frame,
    an input shaft,
    an output shaft,
    first and second simple planetary assemblies each having one sun gear, one ring gear, and one carrier with planet gears, the ring gear of said first planetary assembly being connected to the carrier of said second planetary assembly and rigidly and directly to said output shaft,
    a reversible speed-varying module rigidly and directly connected to said input shaft and connecting said input shaft to said first sun gear,
    braking means for releasably connecting the carrier of said first planetary assembly to said frame, in a first, starting range, both in forward and reverse modes, whereby when said braking means is engaged, said output shaft is driven from said input shaft through said speed-varying module and said first planetary assembly,
    first releasable clutching means for connecting, at a first shift point, the sun gear of said second planetary assembly with said input shaft, in a second, intermediate speed range, and
    second releasable clutching means connecting, at a second shift point, the carrier of said first planetary assembly to said input shaft in a third, high-speed range.

2. The power transmission of claim 1 wherein said speed-varying module comprises:
    a pair of hydraulic pump-motor units hydraulically interconnected so that one serves as a pump while the other serves as a motor and vice versa, and
    a first said hydraulic pump-motor unit being rigidly and directly connected in driving relation to said input shaft and a second said hydraulic pump-motor unit being connected rigidly and directly to said first sun gear,
    whereby said first range is hydrostatic and said second and third ranges hydromechanical.

3. The power transmission according to claim 2 wherein said first hydraulic pump-motor unit is variable in stroke and runs during operation at constant speed while said second pump-motor unit is fixed in stroke and variable in speed.

4. The power transmission according to claim 3 wherein said input shaft, said output shaft, said first planetary assembly, said second planetary assembly, said first hydraulic unit, and said second hydraulic unit are all coaxial.

5. The power transmission according to claim 3 wherein said input shaft and said output shaft are parallel to each other, said first hydraulic unit being coaxial with said input shaft, said second hydraulic unit and said first and second planetary assemblies being coaxial with said output shaft.

6. The power transmission of claim 2 wherein the gear ratios are as follows, so as to achieve equal hydraulic horsepower and nearly equal transmission efficiencies on both sides of each shift point:
    Ratios to each other within the first planetary assembly:
        first sun gear—1
        first planet gears—1
        first ring gear—3
    Ratios to each other within the second planetary assembly:
        second sun gear—2
        second planet gears—1
        second ring gear—4

7. The power transmission of claim 2 wherein the respective gears bear the following number of teeth:
    first sun gear—30
    first planet gears—30
    first ring gear—90
    second sun gear—40
    second planet gears—20
    second ring gear—80

8. The power transmission of claim 1, wherein
    said braking means is engaged only during a hydrostatic starting range,
    said first clutching means is engaged at said first shift point, at which said brake is released, for placing said transmission in a first power-split hydromechanical power range, said first sun gear reaching zero speed at some point in said first power-split range subsequent to said first shift point, said second clutch means is engaged at a second shift point for a second power-split hydromechanical range, the planetary gear ratios in said assemblies being such that the output speed ratio at said first shift point being one-half of the output speed ratio in the first power-split range at the time said first sun gear is at zero speed, thereby causing power in said speed-varying module to be of the same magnitude on both sides of said first shift point.

9. The power transmission of claim 8 wherein said planetary gear ratios are also such that the output speed ratio at the second shift point is equal to the output speed ratio in said first hydromechanical range when said sun gear is at zero speed plus the output speed ratio in said second hydromechanical range when said sun gear is at zero speed minus one, causing the power in said speed-varying module to be of the same magnitude on both sides of said second shift point.

10. A three-range power transmission with two shift points, comprising:
a stationary frame,
input means,
output means,
first and second planetary assemblies each having at least one sun gear, ring gear, and carrier with planet gears, a ring gear of said first planetary assembly being connected rigidly and directly to the carrier of said second planetary assembly and directly and rigidly to said output means,
a reversible speed-varying module directly and rigidly connected to said input means and connecting said input means to said first sun gear,
braking means for releasably connecting a carrier to said first planetary assembly to said frame in a first, starting range and in a reverse range, whereby when said braking means is engaged, said output means is driven from said input means through said speed-varying module and said first planetary assembly,
first releasable clutching means for connecting, at a first shift point, the sun gear of said second planetary assembly with said input means, in a second, intermediate range, with release of said braking means after engagement of said first clutching means,
second releasable clutching means connecting, at a second shift point, a carrier of said first planetary assembly to said input means in a third, high-speed range, with release of said first clutching means after engagement of said second clutching means.

11. The power transmission of claim 10 wherein said speed-varying module comprises:
a pair of hydraulic pump-motor units hydraulically interconnected so that one serves as a pump while the other serves as a motor and vice versa, and
a first said hydraulic pump-motor unit being connected in direct, rigid, driving relation to said input means and a second said hydraulic pump-motor unit being connected directly and rigidly to said first sun gear,
whereby said first range is hydrostatic and said second and third ranges hydromechanical.

12. A power transmission according to claim 11 wherein said first hydraulic pump-motor unit is variable in stroke and runs during operation at constant speed while said second pump-motor unit is fixed in stroke and variable in speed.

13. The transmission of claim 10 wherein said input means, output means, first planetary assembly, second planetary assembly, and said speed varying module are all coaxial.

14. The transmission of claim 10, wherein said input means and said output means are parallel to each other and said planetary assemblies are coaxial with said output means.

15. The transmission of claim 10 wherein said gears of said two planetary assemblies are so proportioned that the hydraulic horsepower on both sides of both shift points is the same.

16. The transmission of claim 10 wherein said first planetary assembly has two sun gears different in size rigidly secured to each other, two ring gears different in size secured to each other, and two planet carriers independent of each other and each with its own separate series of planet gears, one said carrier being connected to said braking means and the other said carrier being connected to said first clutching means.

17. A three-range power transmission with two shift points, comprising:
a stationary frame,
an input shaft,
an output shaft,
a first planetary assembly having two rigidly interconnected sun gears of different sizes, two rigidly interconnected ring gears of different sizes, and first and second independent carriers, each with its own set of planet gears,
a second planetary assembly having a sun gear, a ring gear, and a carrier with planet gears, the two ring gears of said first planetary assembly being rigidily connected to the carrier of said second planetary assembly and therethrough rigidly to said output shaft,
a reversible speed-varying module connecting said input shaft to said sun gears of said first planetary assembly, said module having a first member rigidly connected to said input shaft and a second member rigidly connected to said sun gears,
braking means for releasably connecting said first carrier of first planetary assembly to said frame, in a first, starting range, whereby when said braking means is engaged, said output shaft is driven from said input shaft through said speed-varying module and said first planetary assembly,
first releasable clutching means for connecting, at a first shift point, the sun gear of said second planetary assembly with said input shaft, in a second, intermediate-speed range, and
second releasable clutching means connecting, at a second shift point, said second carrier of said first planetary assembly to said input shaft in a third, high-speed range.

18. The power transmission of claim 17 wherein said speed-varying module comprises:
a pair of hydraulic pump-motor units hydraulically interconnected so that one serves as a pump while the other serves as a motor and vice versa, and
a first said hydraulic pump-motor unit being connected in rigid driving relation to said input shaft and a second said hydraulic pump-motor unit being rigidly connected to said sun gears of said first planetary assembly,
whereby said first range is hydrostatic and said second and third ranges are hydromechanical.

19. A power transmission according to claim 18 wherein said first hydraulic pump-motor unit is variable in stroke and runs during operation at constant speed while said second pumpmotor unit is fixed in stroke and variable in speed.

20. The power transmission of claim 19 wherein said input shaft, said output shaft, said first and second hydraulic units, and said first and second planetary assemblies are all coaxial.

21. A three-range power transmission with two shift points, comprising:
 a stationary frame,
 input means,
 output means,
 a reversible speed-varying hydraulic module directly connected to said input means,
 first and second planetary assemblies, each having three members,
 first and second members of said first assembly being respectively rigidly connected to first and second members of said second assembly in first and second pairs of connected members,
 one said member of said first pair being rigidly connected to said output means,
 a first clutch for releasably connecting said third member of said second assembly to said input means at a first shift point,
 a brake for releasably connecting said second pair to said frame in a first, starting, hydrostatic range prior to said first shift point,
 a second clutch for releasably connecting one said member of said second pair to said input means at a second shift point,
 the third member of said first planetary assembly being rigidly connected to said speed-varying module and serving, when said brake is released, as a reaction member.

22. The power transmission of claim 21 having:
 said brake being used only in said starting hydrostatic range,
 said first clutch being engaged at said first shift point and only in a first power-split hydromechanical range, said reaction member reaching zero speed at some point during said first power-split range,
 said second clutch being engaged at said second shift point and in a second power-split hydromechanical range,
 the planetary gear ratios in said assemblies being such that the output speed ratio at said first shift point is one-half of the output speed ratio in the first power-split range at the time when said reaction member is at zero speed, thereby causing the power in said speed-varying module to be of the same magnitude on both sides of the shift point.

23. The power transmission of claim 21 wherein said planetary ratios are also such that the output speed ratio at said second shift point is equal to the output speed ratio in said first hydromechanical range at the time when said reaction member is at zero speed plus the output speed ratio in said second hydromechanical range at the time when said reaction member is at zero speed minus one, thereby causing power in said speed-varying module to be of the same magnitude on both sides of said second shift point.

24. A power transmission comprising:
 a stationary frame,
 input means,
 output means,
 a reversible speed-varying module connected to said input means,
 a plurality of interconnected planetary assemblies in between said input means and said output means, a first member of one said planetary assembly being rigidly connected to said speed-varying module,
 a brake for a second member of said one planetary assembly, for grounding said second member to said frame during a starting range,
 first clutch means connected to said assemblies for engagement at a first shift point, at which said brake is released, for placing said transmission in a first power-split range, said first member then serving as a reaction member and reaching zero speed at some point in said first power-split range subsequent to said first shift point,
 the planetary gear ratios in said assemblies being such that the output speed ratio at said first shift point is one-half of the output speed ratio in the first power-split range at the time said first member is at zero speed, thereby causing power in said speed-varying module to be of the same magnitude on both sides of said first shift point.

25. The power transmission of claim 24 wherein said starting range is hydrostatic and said first power-split range is hydromechanical.

26. The power transmission of claim 24 having:
 second clutch means connected to said assemblies for engagement at a second shift point into a second power-split range,
 said planetary ratios being such that the output speed ratio at said second shift point is equal to the output speed ratio in said first power-split range when said first member is at zero speed plus the output speed ratio in said second powersplit range when said first member is at zero speed minus one, thereby causing the power in said speed-varying module to be of the same magnitude on both sides of said secons shift point.

27. The power transmission of claim 26 wherein said starting range is hydrostatic and said power-split ranges are hydromechanical.

28. A power transmission comprising:
 a stationary frame,
 input means,
 output means,
 a reversible speed-varying module connected directly to said input means,
 a plurality of interconnected planetary assemblies in between said input means and said output means,
 a shaft directly connecting some member of one said planetary assembly to said speed-varying module, said shaft serving as a reaction in some ranges of said transmission,
 engaging means connected to some other member of one said planetary assembly for placing said transmission in a hydrostatic range,
 a plurality of clutch means connected to said assemblies for successive engagement of one said clutch means at each of a plurality of shift points for placing said transmission in a plurality of successive power-split ranges, said shaft reaching zero speed at some point in the lowest power-split range subsequent to the first said shift point, at which said brake is disengaged,
 the planetary gear ratios in said assemblies being such that the output speed ratio at said first shift point is one-half of the output speed ratio at the time said shaft is at zero speed in said first power-split range, thereby causing power in said speed-varying module to be of the same magnitude on both sides of said first shift point, said planetary gear ratios also being such that the output speed ratio at each shift point between two power-split ranges is equal to the output speed ratio in the lower of those two ranges at the time when said shaft is at zero speed, plus the output speed ratio on the higher of those two ranges when said shaft is at zero speed minus one, thereby causing the power in said speed-varying module to be of the same magnitude on both sides of each such shift point.

29. A three-range power transmission with two shift points, comprising:
- a stationary frame,
- an input shaft,
- an output shaft parallel to said input shaft,
- first and second simple planetary assemblies coaxial with said output shaft, each having one sun gear, one ring gear, and one carrier with planet gears, the ring gear of said first planetary assembly being connected directly to the carrier of said second planetary assembly and directly to said output shaft, the carrier of said first planetary assembly being connected directly to the ring gear of said second planetary assembly,
- a reversible speed-varying module coaxial with said input shaft connecting said input shaft to said first sun gear,
- braking means for releasably connecting the carrier of said first planetary assembly to said frame, in a first, starting, range, whereby when said braking means is engaged, said output shaft is driven from said input shaft through said speed-varying module and said first planetary assembly,
- first releasable clutching means connecting the sun gear of said second planetary assembly to said input shaft at a first shift point, and
- second releasable clutching means for connecting the carrier of said first planetary assembly and the ring gear of said second planetary assembly with said input shaft at a second shift point.

30. The power transmission of claim 29 wherein said speed-varying module comprises:
- a pair of hydraulic pump-motor units hydraulically interconnected so that one serves as a pump while the other serves as a motor and vice versa, and
- a first said hydraulic pump-motor unit being connected in driving relation to said input shaft and a second said hydraulic pump-motor unit being connected to said first sun gear,
- whereby said first range is hydrostatic and said second and third ranges are hydromechanical.

31. The power transmission according to claim 29 wherein
- said first hydraulic pump-motor unit is variable in stroke and runs during operation at constant speed while said second pump-motor unit is fixed in stroke and variable in speed,
- a first gear on said first unit,
- a second gear in mesh with said first unit and mounted on a hollow shaft, said first clutch means connecting said hollow shaft of said second gear to said second sun gear, said second clutch means connecting said hollow shaft of said second gear to said second ring gear and said first carrier.
- said first sun gear being mounted on another hollow shaft having a third gear thereon, and
- a fourth gear mounted on said second unit and in mesh with said third gear.

* * * * *